/

US011635222B2

(12) United States Patent
Sikora et al.

(10) Patent No.: US 11,635,222 B2
(45) Date of Patent: *Apr. 25, 2023

(54) DAMPER FAULT DETECTION

(71) Applicant: Honeywell International Inc., Charlotte, NC (US)

(72) Inventors: Lubos Sikora, Brno (CZ); Adrienne Thomle, Reno, NV (US); Cory Grabinger, Maple Grove, MN (US); Miroslav Mikulica, Brno (CZ); Jan Prostejovsky, Belotin (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/343,678

(22) Filed: Jun. 9, 2021

(65) Prior Publication Data

US 2021/0302038 A1 Sep. 30, 2021

Related U.S. Application Data (63) Continuation of application No. 16/055,002, filed on Aug. 3, 2018, now Pat. No. 11,054,161, which is a
(Continued)

(51) Int. Cl.
*F24F 11/49* (2018.01)
*F24F 11/52* (2018.01)
(Continued)

(52) U.S. Cl.
CPC .............. *F24F 11/49* (2018.01); *F24F 11/30* (2018.01); *F24F 11/38* (2018.01); *F24F 11/52* (2018.01);
(Continued)

(58) Field of Classification Search
CPC .......... F24F 7/00; F24F 11/00; F24F 11/0001; F24F 2011/0002; F24F 2011/0006;
(Continued)

(56) References Cited

U.S. PATENT DOCUMENTS 3,979,922 A 9/1976 Shavit
4,086,781 A 5/1978 Brody et al.
(Continued)

FOREIGN PATENT DOCUMENTS

| JP | S58142138 A | 8/1983 |
|---|---|---|
| WO | 9014556 A1 | 11/1990 |
| WO | 2009061293 A1 | 5/2009 |

OTHER PUBLICATIONS

Burr-Brown Products from Texas Instruments, "Voltage Output Programmable Sensor Conditioner PGA 309," 87 pages, Dec. 2003.
(Continued)

*Primary Examiner* — Len Tran
*Assistant Examiner* — Gustavo A Hincapie Serna
(74) *Attorney, Agent, or Firm* — Seager, Tufte & Wickhem, LLP (57) ABSTRACT

A damper controller may be configured to send damper control commands to open and close an outdoor air damper to provide free cooling as necessary to satisfy a temperature setpoint inside the building. In some cases, the damper controller may initiate a damper fault test to determine if a damper fault is present. The damper fault test may be based, at least in part, on an outdoor air temperature input, a discharge air temperature input, a commanded damper position, and a damper fault temperature threshold. If a damper fault is determined, the damper controller may send an alert indicative of a detected damper fault. In some cases, the damper fault test results may be weighted to reduce the false positives alerts.

20 Claims, 5 Drawing Sheets

Related U.S. Application Data continuation of application No. 14/521,096, filed on Oct. 22, 2014, now Pat. No. 10,060,642.

(51) Int. Cl.

| | | |
|---|---|---|
| *F24F 11/74* | (2018.01) | |
| *F24F 11/64* | (2018.01) | |
| *F24F 11/38* | (2018.01) | |
| *F24F 11/30* | (2018.01) | |
| *F24F 11/00* | (2018.01) | |
| *F24F 110/00* | (2018.01) | |
| *F24F 11/32* | (2018.01) | |
| *F24F 140/40* | (2018.01) | |

(52) U.S. Cl.
CPC .............. *F24F 11/64* (2018.01); *F24F 11/74* (2018.01); *F24F 11/32* (2018.01); *F24F 2011/0006* (2013.01); *F24F 2110/00* (2018.01); *F24F 2140/40* (2018.01); *Y02B 30/54* (2013.01)

(58) Field of Classification Search
CPC .. F24F 11/30; F24F 11/32; F24F 11/52; F24F 2110/00; F24F 2110/40; Y02B 30/542
USPC ....... 236/49.3, 132; 165/200, 201, 205, 208, 165/210, 238, 242, 248, 253, 257
See application file for complete search history.

(56) References Cited

U.S. PATENT DOCUMENTS

| | | |
|---|---|---|
| 4,182,180 A | 1/1980 | Mott |
| 4,186,564 A | 2/1980 | Myers |
| 4,267,967 A | 5/1981 | Beck et al. |
| 4,271,898 A | 6/1981 | Freeman |
| 4,347,712 A | 9/1982 | Benton et al. |
| 4,379,484 A | 4/1983 | Lom et al. |
| 4,389,853 A | 6/1983 | Hile |
| 4,415,896 A | 11/1983 | Allgood |
| 4,423,364 A | 12/1983 | Kompelien et al. |
| 4,495,986 A | 1/1985 | Clark et al. |
| 4,497,031 A | 1/1985 | Froehling et al. |
| 4,543,796 A | 10/1985 | Han et al. |
| 4,570,448 A | 2/1986 | Smith |
| 4,580,620 A | 4/1986 | Fukumoto et al. |
| 4,591,093 A | 5/1986 | Elliott, Jr. |
| 4,605,160 A | 8/1986 | Day |
| 4,646,964 A | 3/1987 | Parker et al. |
| 4,761,966 A | 8/1988 | Stark |
| 4,838,484 A | 6/1989 | Kreuter |
| 4,843,084 A | 6/1989 | Parker et al. |
| 4,884,214 A | 11/1989 | Parker et al. |
| 4,931,948 A | 6/1990 | Parker et al. |
| 4,933,633 A | 6/1990 | Allgood |
| 4,942,740 A | 7/1990 | Shaw et al. |
| 5,103,391 A | 4/1992 | Barrett |
| 5,165,465 A | 11/1992 | Kenet |
| 5,276,630 A | 1/1994 | Baldwin et al. |
| 5,292,280 A | 3/1994 | Janu et al. |
| 5,311,451 A | 5/1994 | Barrett |
| 5,385,297 A | 1/1995 | Rein et al. |
| 5,390,206 A | 2/1995 | Rein et al. |
| 5,418,131 A | 5/1995 | Butts |
| 5,446,677 A | 8/1995 | Jensen et al. |
| 5,535,814 A | 7/1996 | Hartman |
| 5,544,809 A | 8/1996 | Keating et al. |
| 5,564,626 A | 10/1996 | Kettler et al. |
| 5,590,830 A | 1/1997 | Kettler et al. |
| 5,597,354 A | 1/1997 | Janu et al. |
| 5,602,758 A | 2/1997 | Lincoln et al. |
| 5,605,280 A | 2/1997 | Hartman |
| 5,675,979 A | 10/1997 | Shah |
| 5,706,190 A | 1/1998 | Russ et al. |
| 5,719,408 A | 2/1998 | Yamamoto et al. |
| 5,737,934 A | 4/1998 | Shah |
| 5,762,420 A | 6/1998 | Mills |
| 5,772,501 A | 6/1998 | Merry et al. |
| 5,791,408 A | 8/1998 | Seem |
| 5,801,940 A | 9/1998 | Russ et al. |
| 5,813,600 A | 9/1998 | Straub |
| 5,874,736 A | 2/1999 | Pompei |
| 5,970,430 A | 10/1999 | Burns et al. |
| 5,971,067 A | 10/1999 | Rayburn et al. |
| 6,006,142 A | 12/1999 | Seem et al. |
| 6,026,352 A | 2/2000 | Burns et al. |
| 6,125,540 A | 10/2000 | Court et al. |
| 6,126,540 A | 10/2000 | Janu et al. |
| 6,161,764 A | 12/2000 | Jatnieks |
| 6,223,544 B1 | 5/2001 | Seem |
| 6,249,100 B1 | 6/2001 | Lange |
| 6,250,382 B1 | 6/2001 | Rayburn et al. |
| 6,415,617 B1 | 7/2002 | Seem |
| 6,488,081 B2 | 12/2002 | Rayburn et al. |
| 6,491,094 B2 | 12/2002 | Rayburn et al. |
| 6,514,138 B2 | 2/2003 | Estepp |
| 6,578,770 B1 | 6/2003 | Rosen |
| 6,581,847 B2 | 6/2003 | Kline et al. |
| 6,608,558 B2 | 8/2003 | Sen et al. |
| 6,609,967 B2 | 8/2003 | Sharp et al. |
| 6,629,886 B1 | 10/2003 | Estepp |
| 6,634,422 B2 | 10/2003 | Rayburn et al. |
| 6,640,162 B1 | 10/2003 | Swanson |
| 6,756,998 B1 | 6/2004 | Bilger |
| 6,778,945 B2 | 8/2004 | Chassin et al. |
| 6,792,767 B1 | 9/2004 | Pargeter et al. |
| 6,826,920 B2 | 12/2004 | Wacker |
| 6,851,621 B1 | 2/2005 | Wacker et al. |
| 6,916,239 B2 | 7/2005 | Siddaramanna et al. |
| 6,981,383 B2 | 1/2006 | Shah et al. |
| 6,988,671 B2 | 1/2006 | Deluca |
| 7,036,559 B2 | 5/2006 | Stanimirovic |
| 7,044,397 B2 | 5/2006 | Bartlett et al. |
| 7,055,759 B2 | 6/2006 | Wacker et al. |
| 7,059,536 B2 | 6/2006 | Schneider et al. |
| 7,099,748 B2 | 8/2006 | Rayburn |
| 7,104,460 B2 | 9/2006 | Masen et al. |
| 7,106,460 B2 | 9/2006 | Haines et al. |
| 7,114,554 B2 | 10/2006 | Bergman et al. |
| 7,177,776 B2 | 2/2007 | Whitehead |
| 7,222,800 B2 | 5/2007 | Wruck |
| 7,258,280 B2 | 8/2007 | Wolfson |
| 7,331,852 B2 | 2/2008 | Ezell et al. |
| 7,378,954 B2 | 5/2008 | Wendt |
| 7,398,821 B2 | 7/2008 | Rainer et al. |
| 7,434,413 B2 | 10/2008 | Wruck |
| 7,475,828 B2 | 1/2009 | Bartlett et al. |
| 7,484,668 B1 | 2/2009 | Eiler |
| 7,525,787 B2 | 4/2009 | Dhindsa et al. |
| 7,546,200 B2 | 6/2009 | Justice |
| 7,565,225 B2 | 7/2009 | Dushane et al. |
| 7,574,871 B2 | 8/2009 | Bloemer et al. |
| 7,632,178 B2 | 12/2009 | Meneely, Jr. |
| 7,641,126 B2 | 1/2010 | Schultz et al. |
| 7,758,407 B2 | 7/2010 | Ahmed |
| 7,765,072 B2 | 7/2010 | Eiler et al. |
| 7,797,080 B2 | 9/2010 | Durham, III |
| 7,827,813 B2 | 11/2010 | Seem |
| 7,854,135 B2 | 12/2010 | Stanimirovic |
| 7,891,573 B2 | 2/2011 | Finkam et al. |
| 7,904,830 B2 | 3/2011 | Hoglund et al. |
| 7,935,729 B2 | 5/2011 | Harbige et al. |
| 7,979,163 B2 | 7/2011 | Terlson et al. |
| 7,987,680 B2 | 8/2011 | Hamada et al. |
| 7,992,630 B2 | 8/2011 | Springer et al. |
| 8,027,742 B2 | 9/2011 | Seem et al. |
| 8,066,558 B2 | 11/2011 | Thomle et al. |
| 8,070,569 B2 * | 12/2011 | Palmer .................. H05K 7/207 454/184 |
| 8,109,101 B2 * | 2/2012 | Taras ..................... F24F 11/30 62/89 |
| 8,147,302 B2 | 4/2012 | Desrochers et al. |
| 8,185,244 B2 | 5/2012 | Wolfson |
| 8,195,335 B2 | 6/2012 | Kreft et al. |

(56) References Cited

U.S. PATENT DOCUMENTS

| | | | |
|---|---|---|---|
| 8,200,344 B2 | 6/2012 | Li et al. | |
| 8,200,345 B2 | 6/2012 | Li et al. | |
| 8,219,249 B2 | 7/2012 | Harrod et al. | |
| 8,239,168 B2 | 8/2012 | House et al. | |
| 8,326,464 B2 | 12/2012 | Clanin | |
| 8,364,318 B2 | 1/2013 | Grabinger et al. | |
| 8,412,654 B2 | 4/2013 | Montalvo | |
| 8,433,446 B2* | 4/2013 | Grohman | F24F 11/62 700/80 |
| 8,478,433 B2 | 7/2013 | Seem et al. | |
| 8,515,584 B2 | 8/2013 | Miller et al. | |
| 8,567,204 B2 | 10/2013 | Seem | |
| 8,583,289 B2 | 11/2013 | Stack et al. | |
| 8,635,182 B2 | 1/2014 | Mackay | |
| 8,688,278 B2 | 4/2014 | Kreft et al. | |
| 8,719,385 B2 | 5/2014 | Nair et al. | |
| 8,719,720 B2 | 5/2014 | Grabinger et al. | |
| 8,725,298 B2 | 5/2014 | Wallaert | |
| 9,097,432 B2 | 8/2015 | Kreft et al. | |
| 9,279,596 B2 | 3/2016 | Goldschmidt et al. | |
| 9,435,557 B2 | 9/2016 | Albrecht et al. | |
| 9,581,985 B2 | 2/2017 | Walser et al. | |
| 9,765,986 B2 | 9/2017 | Thomle et al. | |
| 9,845,963 B2 | 12/2017 | Mikulica et al. | |
| 11,054,161 B2* | 7/2021 | Sikora | F24F 11/30 |
| 2003/0181158 A1 | 9/2003 | Schell et al. | |
| 2005/0120583 A1 | 6/2005 | Huttlin | |
| 2006/0004492 A1 | 1/2006 | Terlson et al. | |
| 2006/0009862 A1 | 1/2006 | Imhof et al. | |
| 2006/0107670 A1 | 5/2006 | Thomle et al. | |
| 2006/0117769 A1 | 6/2006 | Helt et al. | |
| 2006/0130502 A1 | 6/2006 | Wruck et al. | |
| 2007/0023533 A1 | 2/2007 | Liu | |
| 2007/0037507 A1 | 2/2007 | Liu | |
| 2007/0084938 A1 | 4/2007 | Liu | |
| 2007/0205297 A1 | 9/2007 | Finkam et al. | |
| 2007/0289322 A1 | 12/2007 | Mathews | |
| 2008/0176503 A1 | 7/2008 | Stanimirovic | |
| 2008/0179408 A1 | 7/2008 | Seem | |
| 2008/0179409 A1 | 7/2008 | Seem | |
| 2009/0143915 A1 | 6/2009 | Dougan et al. | |
| 2009/0158188 A1 | 6/2009 | Bray et al. | |
| 2009/0165485 A1 | 7/2009 | Stark | |
| 2009/0301123 A1 | 12/2009 | Monk et al. | |
| 2010/0070907 A1 | 3/2010 | Harrod et al. | |
| 2010/0105311 A1 | 4/2010 | Meneely, Jr. | |
| 2010/0106308 A1 | 4/2010 | Filbeck et al. | |
| 2010/0106333 A1 | 4/2010 | Grohman et al. | |
| 2010/0106334 A1 | 4/2010 | Grohman et al. | |
| 2010/0106543 A1 | 4/2010 | Marti | |
| 2010/0198411 A1 | 8/2010 | Wolfson | |
| 2011/0010621 A1 | 1/2011 | Wallaert et al. | |
| 2011/0046790 A1 | 2/2011 | Miller et al. | |
| 2011/0047418 A1 | 2/2011 | Drees et al. | |
| 2011/0093493 A1 | 4/2011 | Nair et al. | |
| 2011/0097988 A1 | 4/2011 | Lord | |
| 2011/0113360 A1 | 5/2011 | Johnson et al. | |
| 2011/0115816 A1 | 5/2011 | Brackney | |
| 2011/0160914 A1 | 6/2011 | Kennett | |
| 2011/0172831 A1 | 7/2011 | Kreft | |
| 2011/0178977 A1 | 7/2011 | Drees | |
| 2011/0264273 A1* | 10/2011 | Grabinger | G05B 19/0428 236/51 |
| 2011/0264275 A1 | 10/2011 | Thomle et al. | |
| 2011/0264280 A1 | 10/2011 | Grabinger et al. | |
| 2012/0078563 A1* | 3/2012 | Grabinger | F24F 11/30 702/104 |
| 2012/0232702 A1 | 9/2012 | Vass et al. | |
| 2012/0245968 A1 | 9/2012 | Beaulieu et al. | |
| 2013/0013117 A1 | 1/2013 | Desrochers | |
| 2013/0180700 A1 | 7/2013 | Aycock | |
| 2013/0324027 A1 | 12/2013 | Davis | |
| 2014/0095935 A1* | 4/2014 | Zimmermann | G05B 23/0251 714/33 |
| 2014/0190191 A1* | 7/2014 | Slessman | H05K 7/20309 62/177 |
| 2014/0190198 A1 | 7/2014 | Slessman et al. | |
| 2014/0207288 A1 | 7/2014 | Albrecht et al. | |
| 2014/0277759 A1 | 9/2014 | Sipe et al. | |
| 2014/0309791 A1 | 10/2014 | Grabinger et al. | |
| 2015/0309120 A1 | 10/2015 | Bujak, Jr. et al. | |

OTHER PUBLICATIONS

California Energy Commission, "2008 Building Energy Efficient Standards for Residential and Nonresidential Buildings," 176 pages, Dec. 2008.

California Energy Commission , "Reference Appendices for the 2008 Building Energy Efficient Standards for Residential and Non-Residential Buildings," 363 pages, Dec. 2008, revised Jun. 2009.

Carrier Corporation, "Getting More for Less, How Demand Controlled Ventilation Increases Air Quality and Reduces Costs," 7 pages, Dec. 1998.

Femp, "Demand-Controlled Ventilation Using $CO^2$ Sensors," Federal Technology Alert, A New Technology Demonstration Publication, 28 pages, Mar. 2004.

Honeywell, "Product Information Sheet," pp. 134-135, prior to Sep. 24, 2010.

Honeywell, "W6210A,D and W7210A,D Solid State Economizer Logic Module," Product Data, 24 pages, prior to Sep. 24, 2010.

Honeywell, "W7212, W7213,W7214 Economizer Logic Modules for Ventilation Control," Product Data, 16 pages, 2004.

Honeywell, "W7212, W7213, W7214 Economizer Logic Modules for Ventilation Control," Product Data, 24 pages, revised Mar. 2010.

Honeywell, "Building Control Systems, Use of Demand Control Ventilation in Your HVAC System," 1 pages, Nov. 2005.

Honeywell, Fresh Air Economizer™ Systems, 2 pages, 1999.

http://content.honeywell.com/building/components/pr/econstudy.asp; "Honeywell Hvac—Economizer Study," 3 pages, printed Oct. 21, 2004.

http://www.automatedbuildings.com/releases/mar09/090312111454honeywell.htm, "Honeywell Introduces Economizer Savings Tool and Selectable Dry Bulb Temperature Sensor to Reduce Energy Consumption," 2 pages, Mar. 2009.

http://www.colemparmer.com/Assets/manual, Digi-Sense Humidity Meter Model No. 60020-40, 68X309920 Rev. 0, OakTon Blue Tech Instruments, 28 pages, Jun. 2004.

http://www.nmschembio.org.uk/dm_uk/documents/lgcvam2003032_xsjgl.pdf. "Preparation of Calibration Curves, A Guide to Best Practice," LGC/VAM2003/032, 30 pages, Sep. 2003.

http://www.pexsupply.com/Honeywell-W7210A1001-Series-72-Economizer-TwoSPDT . . . , "Series-72-Economizer-TwoSPDT One 2-10VDC," SKU:W7210A1001, 2 pages, printed Sep. 7, 2010.

http://www.ti.com/lit/an/sboa111.pdf, "A Practical Technique for Minimizing the Number of Measurements in Sensor Signal Conditioning Calibration," Texas Instruments, Application Report SBOA111, pp. 1-9, Jun. 2005.

Kingrey et al; "Checking Economizer Operation," Washington State University Extension Energy Program, 3 pages, Feb. 6, 2009.

New Buildings Institute, "Commercial Rooftop HVAC Energy Savings Research Program, Draft (A) Final Project Report," 99 pages, Mar. 25, 2009.

PurpleSwift, "DC6 Ahu Economizer Unit," 2 pages, downloaded Jul. 1, 2010.

Rooftop Systems, Inc; "Economizer Catalog, Version 1.1," 20 pages, downloaded Jul. 1, 2010.

Taylor, "Comparing Economizer Relief Systems" ASHRAE Journal, pp. 33-42, Sep. 2000.

Hjortland et al; "General Outdoor Air Economizer Fault Detection & Diagnosis Assessment Method," Purdue University- Purdue e Pubs, International Refrigeration and Air Conditioning Conference. 10 pages, 2012.

Honeywell. "Jade Economizer Module (Model W7220), Installation Instructions," 20 pages, 2010.

(56) References Cited

OTHER PUBLICATIONS

Fernandez et al; "Self-Correcting HVAC Controls: Algorithms for Sensors and Dampers in Air-Handling Units," U.S. Department of Energy, PNNL-19104, 49 pages, Dec. 2009.
http://av8rdas.wordpress.com/2013/01/17/retrocommisioning-findings-economizer-mi . . . , "Retrocommissioning Findings: Economizer Mixed Air Plenum Stratification-Overview," 8 pages, printed Mar. 24, 2014.

* cited by examiner

DAMPER FAULT DETECTION

This is a continuation of co-pending U.S. patent application Ser. No. 16/055,002, filed Aug. 3, 2018, entitled "Damper Fault Detection", which is a continuation of U.S. patent application Ser. No. 14/521,096, filed Oct. 22, 2014, now U.S. Pat. No. 10,060,642, entitled "Damper Fault Detection", both of which are incorporated herein by reference.

TECHNICAL FIELD

The disclosure relates generally to Heating, Ventilation, and Air Conditioning (HVAC) systems for conditioning the air of an inside space of a building or other structure, and more particularly, to economizer and/or demand control ventilation systems.

BACKGROUND

Most modern buildings use some sort of an HVAC system to control the environment conditions inside of the building. Such HVAC systems can be configured to control a number of different environmental conditions including, for example, temperature, humidity, air quality and/or other environmental conditions, as desired. In many HVAC systems, air from the building's inside space is drawn into return ducts and provided back to the HVAC system, where the return air is conditioned and provided back to the inside space. To meet desired ventilation requirements, some HVAC systems include an economizer and/or demand control ventilation system (DCV). Such systems often include an exhaust port for exhausting at least some of the return air to the outside environment, and/or an intake port for bringing fresh air into the HVAC system. In some instances, a damper system including one or more dampers is provided to control how much return air is exhausted and/or how much outside air is brought into the building. In many instances, the air supplied by the HVAC system to the inside space can be a mixture of fresh outside air and return air, depending on the conditions. To maintain the energy efficiency of the HVAC system, it may be useful to ensure that the dampers are functioning properly.

SUMMARY

The present disclosure relates generally to Heating, Ventilation, and Air Conditioning (HVAC) systems for conditioning the air of an inside space of a building or other structure, and more particularly, to economizer and/or demand control ventilation systems. In one example, a Demand Control Ventilation (DCV) and/or Economizer system for a building may include: a return air inlet, an outdoor air inlet and a discharge air outlet; an outdoor air damper for controlling air flow through the outdoor air inlet; a damper actuator operatively coupled to the outdoor air damper; one or more sensors including a discharge air temperature sensor for sensing the discharge air temperature of air passing through the discharge air outlet and an outdoor air temperature sensor for sensing the outdoor air temperature; and a controller operatively coupled to the damper actuator and the one or more sensors. The controller may be configured to provide a damper control signal to the damper actuator to direct the outdoor air damper to a commanded damper position such that a desired flow of outside air is drawn through the outdoor air inlet. The controller can further be configured to initiate a damper fault test to determine if a damper fault is present. The damper fault test may be based, at least in part, on the outdoor air temperature, the discharge air temperature, the commanded damper position, and a damper fault temperature threshold. The system may include a user interface including a display, where if a damper fault is detected by the damper fault test, the controller may be configured to display on the display an alert indicative of the detected damper fault. The display may be local and attached to the Demand Control Ventilation (DCV) and/or Economizer system, or may be located remotely.

In another example, a controller for a Demand Control Ventilation (DCV) and/or Economizer system for a building may include a memory for storing a control algorithm for controlling the Demand Control Ventilation (DCV) and/or Economizer system, and a processor operatively coupled to the memory for executing the control algorithm. In some cases, the processor may be configured to: send damper control commands to open and close the outdoor air damper to commanded positions to provide free cooling as necessary to satisfy a temperature setpoint inside the building; initiate a damper fault test to determine if a damper fault is present, where the damper fault test may be based, at least in part, on an outdoor air temperature input, a discharge air temperature input, a commanded damper position, and a damper fault temperature threshold; and send an alert indicative of a detected damper fault.

In yet another example, a method for controlling a DCV and/or Economizer system may include opening and closing an outdoor air damper of the DCV and/or Economizer system to provide free cooling as necessary to a building to satisfy a temperature setpoint, and when the outdoor air damper is to be opened to provide free cooling to satisfy the temperature setpoint, performing a damper open fault test. The damper open fault test may include: saving a discharge air temperature of the discharge air passing through the discharge air outlet before opening the outdoor air damper to an open position; opening the outdoor air damper; and after opening the outdoor air damper to the open position, determining if the stored discharge air temperature minus a predetermined dead band is not greater than the discharge air temperature sensed after the outdoor air damper is opened to provide free cooling, indicating a damper open fault. The method may further include performing a close damper fault test when the outdoor air damper is to be closed after providing free cooling. The close damper fault test may include: saving the discharge air temperature of the discharge air passing through the discharge air outlet before closing the outdoor air damper to a closed position; closing the outdoor air damper; and after closing the outdoor air damper to the closed position, determining if the stored discharge air temperature plus a predetermined dead band is not less than the discharge air temperature sensed after the outdoor air damper is closed after providing free cooling, indicating a damper close fault. In some cases, the method may include storing an indicator of a damper fault in a memory based on an indication of damper open faults and/or damper close faults. In some cases, an alert may be provided to a user (e.g. via a display) when a damper open fault and/or a damper close fault is detected.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

Figure 1:
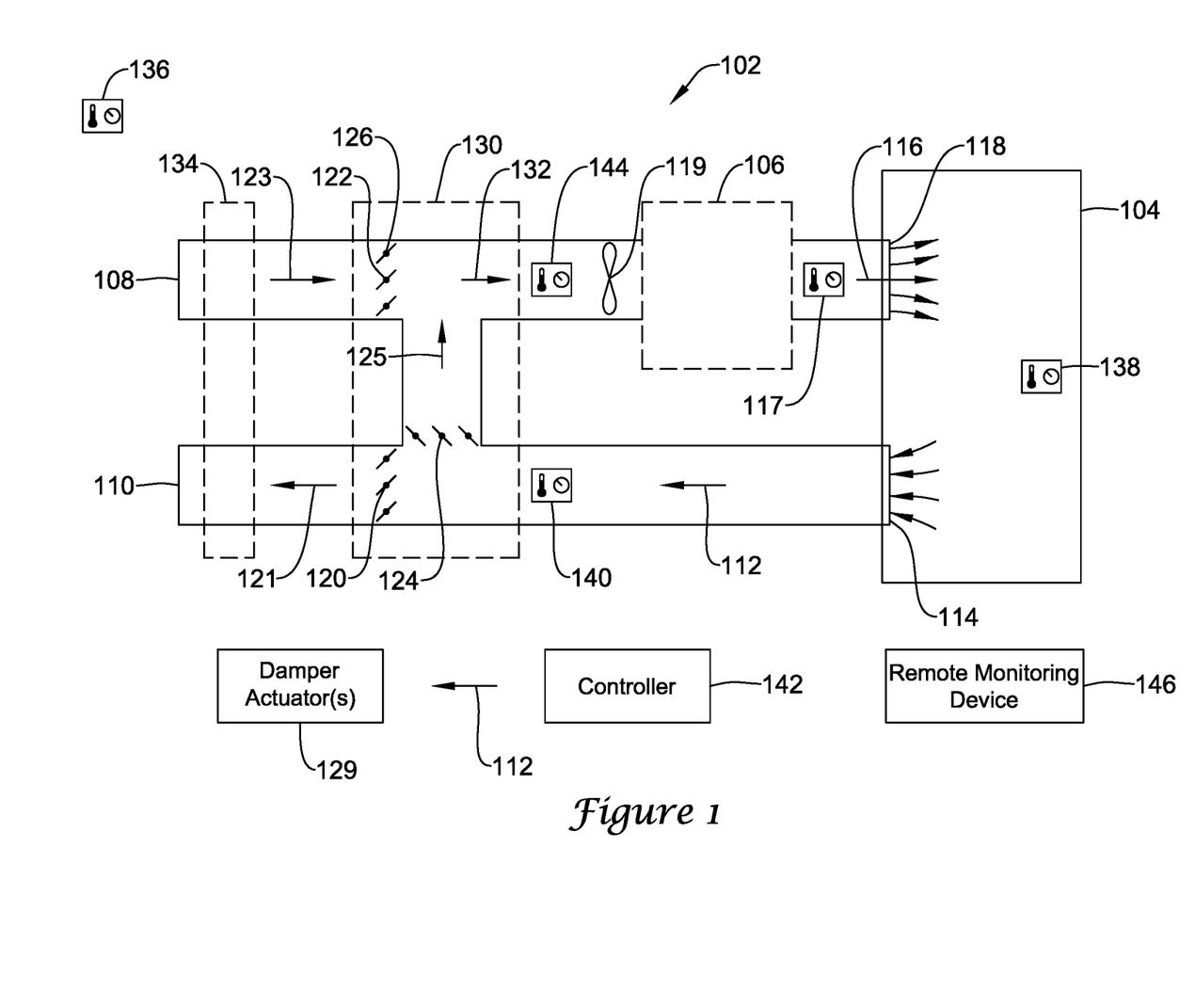
FIG. 1 is a schematic diagram showing an illustrative HVAC system of a building including an economizer/demand control ventilation (DCV) system.

FIG. 1 is a schematic diagram showing an illustrative Heating, Ventilation, and Air Conditioning (HVAC) system 102 of a building 104. The HVAC system 102 may include a Demand Control Ventilation (DCV) and/or Economizer system 130. The building 104 may be a residential, commercial, or any other suitable building. The HVAC system 102 may include an HVAC unit 106, which in some cases may include one or more heating and/or cooling units. In some embodiments, the HVAC unit(s) 106 may be positioned on a rooftop (as in some commercial buildings) whereas in other embodiments, the HVAC unit(s) may be located within the building. In the illustrative embodiment shown, the HVAC system 102 includes a DCV and/or Economizer 130 upstream of the HVAC unit 106. The DCV and/or Economizer 130 may include an outside air intake 108 and/or an exhaust vent 110. A return air stream 112 is shown drawing return air from the inside space of the building 104 through one or more return registers 114 of the building. The illustrative HVAC system 102 includes a fan 119, which may be a single, multiple or infinite speed fan, and which can be controlled to induce an air flow through the HVAC unit 106 and to the building 104 as shown at 116 through one or more supply registers 118. In some cases, the DCV and/or Economizer 130 may include its own fan.

As shown, the DCV and/or Economizer system 130 of the HVAC system 102 may employ one or more dampers within the various ducts of the DCV and/or Economizer system 130 to control air flows. The one or more dampers may be coupled to a damper actuator 129 that causes the damper(s) to move from a first position to a second position. In some instances, these dampers may include an exhaust damper 120 to regulate the fraction of the return air stream 112 that is exhausted 121 from the building 104, an intake damper 122 to regulate the flow of an incoming outside air stream 123 into the building 104, and/or a return damper 124 to regulate the flow of the retained return air stream 125 to mix with the incoming outside air stream 123. In some cases, the dampers 120, 122, and/or 124, and their respective damper actuators 129, may be mechanically coupled together to open and close in a coordinated manner, but this is not required. For example, in some illustrative embodiments, dampers 120 and 122 may open and close together or in sequence, and damper 124 may open and close in an opposite manner to dampers 120 and 122. When so provided, when damper 122 is opened to allow more of the outside air stream 123 into the building 104, damper 120 may also open to allow a similar amount of the return air stream 112 to be exhausted 121 from the building 104. The return air damper 124 may close as the dampers 120 and 122 open. This arrangement may help balance the pressure inside the HVAC system 102 and building 104. In some illustrative embodiments, more or fewer of the dampers 120, 122, and 124 may be employed, but the teachings of this disclosure may be applied advantageously to any suitable HVAC system.

In some cases, as will be described herein, it may be useful to determine if the dampers 120, 122 and/or 124 are functioning properly. An alert or other indication may be triggered if it is determined that the dampers are not responding to a control signal and/or are positioned incorrectly in response to a control signal. In some cases, this determination may be based, at least in part, on a sensed discharge air temperature and a detected or calculated damper position. For example, a system with a correctly functioning damper will cause almost an immediate change in temperature when the damper is moved from a first position to a second position, assuming a difference in temperature between the outside air 123 and the return air 112. Thus, based on a sensed change in temperature, it may be possible to determine the actual damper position. In some cases, damper position and whether the damper is functioning properly may be determined based, at least in part, on a sensed change in discharge air temperature 116 and/or mixed air temperature 132, along with the difference in temperature between the outdoor air and the return air.

Additionally, or alternatively, a damper position sensor 126 may be used to monitor and determine the damper position. Exemplary damper positions sensors 126 may include optical, magnetic, mechanical, ultrasonic or other sensors, which may be coupled to the damper actuator 129, damper, or damper shaft. Knowing the position of the damper may be useful in determining if a damper malfunction has occurred (e.g. damper slippage, damper actuator failure, etc.). Damper malfunction may occur when the damper does not respond or is slow to respond to a control signal that commands the damper to move from a first position to a second position.

In some embodiments, the Demand Control Ventilation (DCV) system, including the dampers 120, 122, 124 and/or associated duct work, may be included in an economizer unit housing, but this is not required. Under some conditions, such an economizer unit may be used to provide a first stage of free cooling by mixing cooler incoming outside air 123 with the sometimes warmer retained return air 125 to provide a cooler mixed air stream 132 to the cooling coils of the HVAC unit 106. Note that in the present disclosure, "return air" may refer to the return air stream 112, before it has been (possibly) divided into an exhaust air stream 121 and a retained return air stream 125, and in other cases, "return air" or "return air stream" may refer to the retained return air stream 125, regardless of whether the retained return air stream 125 includes the entire return air stream 112 or only a fraction thereof. It generally will be clear from context what "return air" refers to, and in the case of referring to the contribution of inside air to the mixed air stream 132, it generally is to be understood that the retained return air stream 125, which originates from the return air stream 112, may be referred to as "return air."

In some instances, the HVAC system 102 may include a heat exchanger generally shown at 134 to transfer heat energy between the incoming outside air stream 123 and the exhausted air stream 121, which may be useful under some operating conditions. The heat exchanger 134 may include, for example, an Energy Recovery Ventilator (ERV), a Heat Recover Ventilator (HRV) and/or any other suitable heat exchanger as desired.

Decisions for when and how to use the DCV and/or Economizer 130 to provide free cooling may depend on strategies that consider current and/or past conditions of outside air and/or indoor air. In some instances, the HVAC system 102 of FIG. 1 may include one or more outdoor air sensors 136 for measuring one or more parameters of the outside air. Current economizer strategies are typically based on dry bulb temperature, enthalpy, a combination of the two, or a sensed enthalpy that approximates the two. These strategies generally base a decision to economize (e.g., whether to draw in outside air in amounts greater than those needed to meet Demand Control Ventilation requirements) on the outside air temperature or enthalpy and whether there is a need to cool the inside space of the building 104.

The HVAC system of FIG. 1 may include one or more inside air sensors 138 for measuring one or more parameters of the air of the inside space of the building 104. Alternatively, or in addition, one or more return air stream sensors 140 may be provided to measure parameters of the air of the inside space, given that the return air stream 112 is drawn from the inside space of the building 104. In some cases, a mixed air sensor 144 may be provided. Any of discharge air 138, return air 140, mixed air 144, and outside air 136 sensors may be configured to determine one or more air parameters of interest, such as dry bulb temperature, wet bulb temperature, dew point (i.e., dew point temperature), relative humidity, and/or enthalpy (i.e., specific enthalpy), to name a few. Notably, these air parameters are not all independent. With appropriate assumptions (e.g., ideal gases, etc.), their interrelationship may be expressed through psychrometric equations and represented graphically, for example on a psychrometric chart, or numerically as desired. Some desired air parameters may be obtained from measurements of two other appropriately chosen air parameters. For example, dew point and/or enthalpy may be calculated from measured values of dry bulb temperature and relative humidity. In some illustrative embodiments, any of the discharge air 138, return air 140, mixed air 144, and/or outside 136 sensors may be configured to measure or determine two or more air parameters selected from a set of parameters such as dry bulb temperature, dew point, relative humidity, and/or enthalpy.

In some cases, the damper position or a change in damper position may be determined based, at least in part, on a sensed change in discharge air temperature. In turn, the damper position and sensed discharge air temperature may be used to determine a damper fault. A damper fault may occur when the damper is determined to be in an incorrect position or is slow to respond to a control signal. For example, under certain conditions, a change in discharge air temperature 116 is expected in response to a damper position change. If, after a damper position has changed, the sensed discharge air temperature does not increase or decrease (depending on if the damper is open or closed) to meet and/or exceed a predetermined threshold, it may be determined that a damper fault has occurred. In some cases, when discharge air temperature 116 is used to determine damper position, the HVAC unit 106 may be set to be neither heating nor cooling. In other cases, when discharge air temperature 116 is used to determine damper position, the HVAC unit 106 may be set to heating or cooling. In either cases, a change in temperature in the discharge air temperature may be expected when the damper position is changed.

A controller, such as controller 142, may be provided to control the HVAC system 102. Controller 142 may be any suitable controller, and it is contemplated that controller 142 may be configured and programmed in any suitable manner. Controller 142 may be a controller for the entire HVAC system 102, or any appropriate subset or subsystem of the HVAC system 102, such as the DCV and/or Economizer 130. In some cases, controller 142 may be a damper controller and/or may include a damper controller. Physically, controller 142 may be a stand-alone controller, or it may be integrated with other hardware, such as with DCV and/or Economizer 130. In some cases, the controller 142 may be attached to or inside the housing of the DCV and/or Economizer 130.

Controller 142 may be configured to receive information from any suitable source, such as the discharge air 138, return air 140, mixed air 144, outside 136 sensors, and/or damper position sensor, and it may be configured to issue commands to any appropriate component of the HVAC system 102, such as dampers 120, 122, 124, fan 119, HVAC unit 106, etc. Controller 142 may determine when to actuate the outdoor air damper(s) 120 and/or 122 to a commanded position to, for example, provide free cooling as necessary to satisfy a temperature set point within the building. More generally, the controller 142 may be operatively coupled to the damper actuator(s) 125 and the one or more sensors (117, 136, 138, 140, 144), and may provide a damper control signal 127 to the damper actuator(s) 125 to direct the outdoor air damper 122 to a commanded damper position such that a desired flow of outside air 123 is drawn through the outdoor air inlet 108. In some embodiments, the controller 142 may be configured to determine a system fault and/or issue an alert or an alarm. For example, in some instances, the controller 142 may be configured to detect a damper fault indicative of an improperly positioned and/or incorrectly functioning damper and issue an alert indicative of the damper fault. In some cases, the controller 142 may be configured to determine if a damper fault is present based, at least in part, on the outdoor air temperature, the discharge air temperature, a commanded damper position of the damper, and/or a damper fault temperature threshold.

In the event that controller 142 is integrated with hardware or located, for instance with a rooftop unit, it may difficult to determine if the HVAC system 102 and/or DCV and/or Economizer 130 is functioning properly without physically visiting the controller 142. In some instances, a remote monitoring device, such as remote monitoring device 146, may be provided to allow the building owner and/or building occupant to monitor the HVAC system 102 and/or DCV/Economizer 130 without physically visiting the controller 142 or the HVAC unit(s) 106. It is contemplated that in some embodiments, remote monitoring device 146 may be located within building 104, or other location which allows for convenient access to the remote monitoring device 146. In some instances, the remote monitoring device 146 may provide alerts, system faults, and/or alarms in real time to the user. In some embodiments, remote monitoring device 146 may allow remote configuration of the HVAC system 102 and/or DCV/Economizer 130 in order to change control points or other parameters without physically visiting the system 102 as discussed in more detail with respect to FIGS. 2, 3A and 3B. In some embodiments, the controller 142 itself may be located within building 104, or other location which allows for convenient access to the controller 142, but this is not required or even desired in all embodiments. This may, however, reduce the need for a separate remote monitoring device 146.

In some instances, remote monitoring device 146 may include a controller (e.g. microprocessor) in operative communication with a memory and a user interface having a display. In addition, the remote monitoring device 146 may include a transceiver for communicating with the HVAC system 102 and/or DCV/Economizer 130. In some instances, the remote monitoring device 146 may be a dedicated device, dedicated to sending and/or receiving signals to and/or from the HVAC system 102 and/or DC/Economizer 130. In some cases, the remote monitoring device 146 may be a wall mounted device. In other cases, the remote monitoring device 146 may be a smart phone, tablet, personal computer, laptop computer, or other such system that executes a program code stored in the memory that causes the remote monitoring device 146 to communicate with other system controllers (e.g. controller 142) and to display system information, alerts, and/or faults, and that may allow a user to change control points or other parameters without physically visiting the system 102. Regardless of whether the remote monitoring device 146 is a dedicated device or other device (e.g. smart phone, tablet, laptop, etc.), the remote monitoring device 146 may, in some cases, wirelessly monitor and/or communicate with the HVAC system 102 and/or DCV/Economizer 130 including controller 142.

Figure 2:
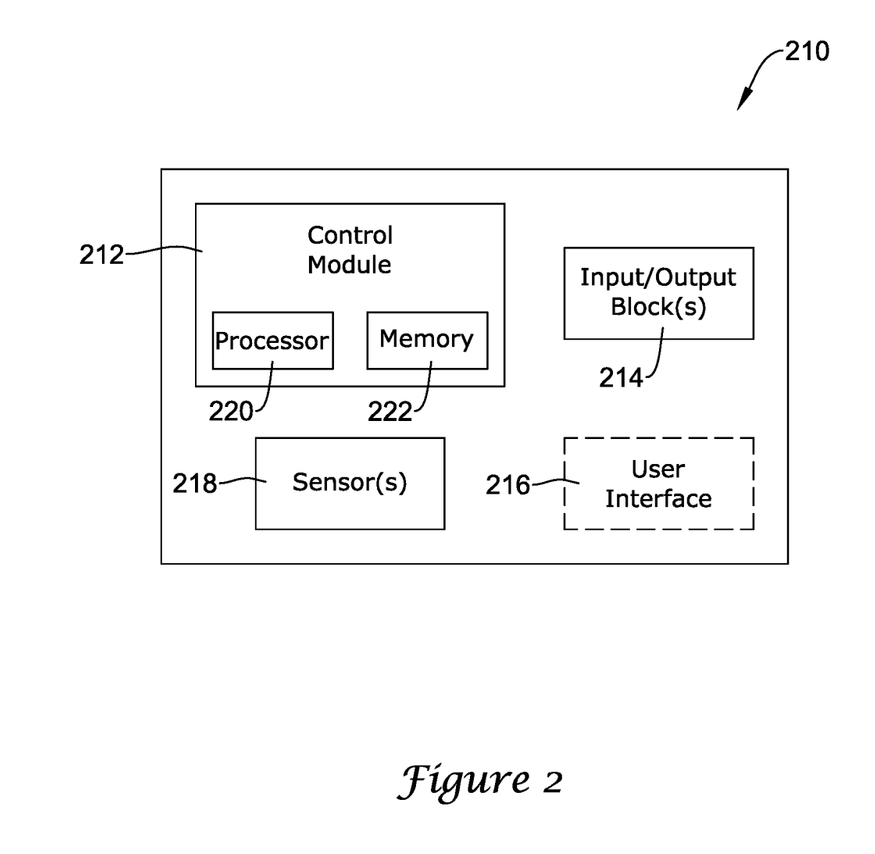
FIG. 2 is block diagram of an illustrative controller of an economizer/demand control ventilation (DCV) system.

FIG. 2 is a block diagram of an illustrative DCV and/or Economizer controller 210, which may be used in conjunction with the HVAC system 102 of FIG. 1. While controller 210 may be described as DCV and/or Economizer controller 210, it should be understood the DCV control system and/or economizer system may function independently of one another and may function on separate control loops, if both are present. Further, while the HVAC system 102 may be described as having an economizing function and demand control ventilation capabilities, it should be understood that one may be present without the other. In the illustrative embodiment, the controller 210 may include a control module 212, one or more input/output blocks 214 for sensing and/or receiving signals to and/or from other system devices (e.g. sensors, actuators, user interfaces, etc.), an optional user interface 216, and one or more sensors 218. However, this is just one example of a suitable controller. In some cases, at least one of the input/output blocks may include a wireless (and/or wired) transceiver for wireless (and/or wired) sending and/or receiving information to and/or from other devices within the system. In some cases, the one or more sensors 218 may include a temperature sensor, a humidity sensor, a ventilation sensor, an air quality sensor (e.g. $CO_2$ sensors), and/or any other suitable HVAC building control system sensor, as desired. Temperature sensor(s) may be provided to sense the discharge air, return air, indoor air, outdoor temperatures and/or mixed air temperatures. Likewise, a humidity sensor may be provided to sense the humidity of the indoor, outdoor and/or mixed air. As illustrated, the one or more sensors 218 may be included with the controller 210, such as within a housing of controller 210. However, it is contemplated that one or more sensors 218 may be located remote from the controller 210, but in operative communication therewith, if desired.

Control module 212 of the illustrative Controller 210 may be configured to help control the comfort level (i.e. heating, cooling, ventilation, and/or air quality, etc.) of at least a portion of the building or structure 104 by controlling one or more dampers 120, 122, 124 and/or activating one or more HVAC components 106, as illustrative in FIG. 1. In some instances, control module 212 may include a processor 220 and a memory 222. Control module 212 may be configured to control and/or set one or more HVAC functions, such as, for example, HVAC schedules, temperature setpoints, humidity setpoints, trend logs, timers, fan speeds, damper positions, damper faults, environment sensing, and/or other HVAC functions or programs, as desired. In some cases, control module 212 may be used to configure one or more settings of the HVAC controller, such as, for example, HVAC controller schedules including ventilation schedules, temperature setpoints, humidity setpoints, trend logs, fault logs, timers, fan speeds, damper positions, damper faults, environment sensing, HVAC controller programs, user preferences, and/or other HVAC controller settings, as desired. In the illustrative embodiment, control module 212 may help control the comfort level of at least a portion of the building or structure using the temperature sensed by temperature sensor of the one or more sensors 218, when provided.

A memory 222 may be used to store any desired information, such as the aforementioned HVAC schedules, temperature setpoints, humidity setpoints, trend logs, timers, fan speeds, damper positions, temperature thresholds, fault logs (including damper fault logs), environmental settings, and any other settings and/or information as desired. Control module 212 may store information within memory 222 and may subsequently retrieve the stored information. Memory 222 may include any suitable type of memory, such as, for example, random-access memory (RAM), read-only memory (ROM), electrically erasable programmable read-only memory (EEPROM), Flash memory, or any other suitable memory, as desired. In some instances, memory 222 may store one or more control programs for execution by the processor 220.

When present, input/output block 214 of the controller 210 may be configured to wirelessly communicate (i.e. transmit and/or receive signals) with a wireless interface of one or more HVAC controllers (and/or HVAC components 106). For example, input/output block 214 may be configured to communicate with a wireless interface of an HVAC controller and send and/or receive signals corresponding to, for example, a temperature sensed by temperature sensor, a humidity sensed by the humidity sensor, heat and/or cool set points, ventilation settings, indoor and/or outdoor air temperatures, return air and/or discharge air temperatures, damper position, equipment status, scheduling, trend logs, and/or any other suitable information and/or data. It is contemplated that the input/output block 214 may include, for example, a radio frequency (RF) wireless interface, an infrared wireless interface, a microwave wireless interface, an optical interface, and/or any other suitable wireless interface, as desired. It is also contemplated that a wired interface may be used instead, or in addition to, any wireless interface.

The optional user interface 216 may be any suitable interface that is configured to display and/or solicit information as well as permit a user to enter data and/or other settings, as desired. In some cases, user interface 216 may allow a user or technician to program and/or modify one or more control parameters of controller 210, such as programming a set point, a time, an equipment status and/or parameter, as desired. In some instances, the user interface 216 may include a touch screen, a liquid crystal display (LCD) panel and keypad, a dot matrix display, a computer, buttons, one or more LED's and/or any other suitable interface, as desired. In one example, at least some of the parameters and/or settings may be transmitted to the controller 210 via input/output block 214, but this is not required or even desired in all embodiments. In some instances, user interface 216 may be configured to alert the user to system faults (e.g. a damper fault or other fault) occurring in the system using, for example, audio and/or visual alerts. In some cases, controller 210 may only control the DCV and/or Economizer system, and not the HVAC system more generally.

Figure 3A:
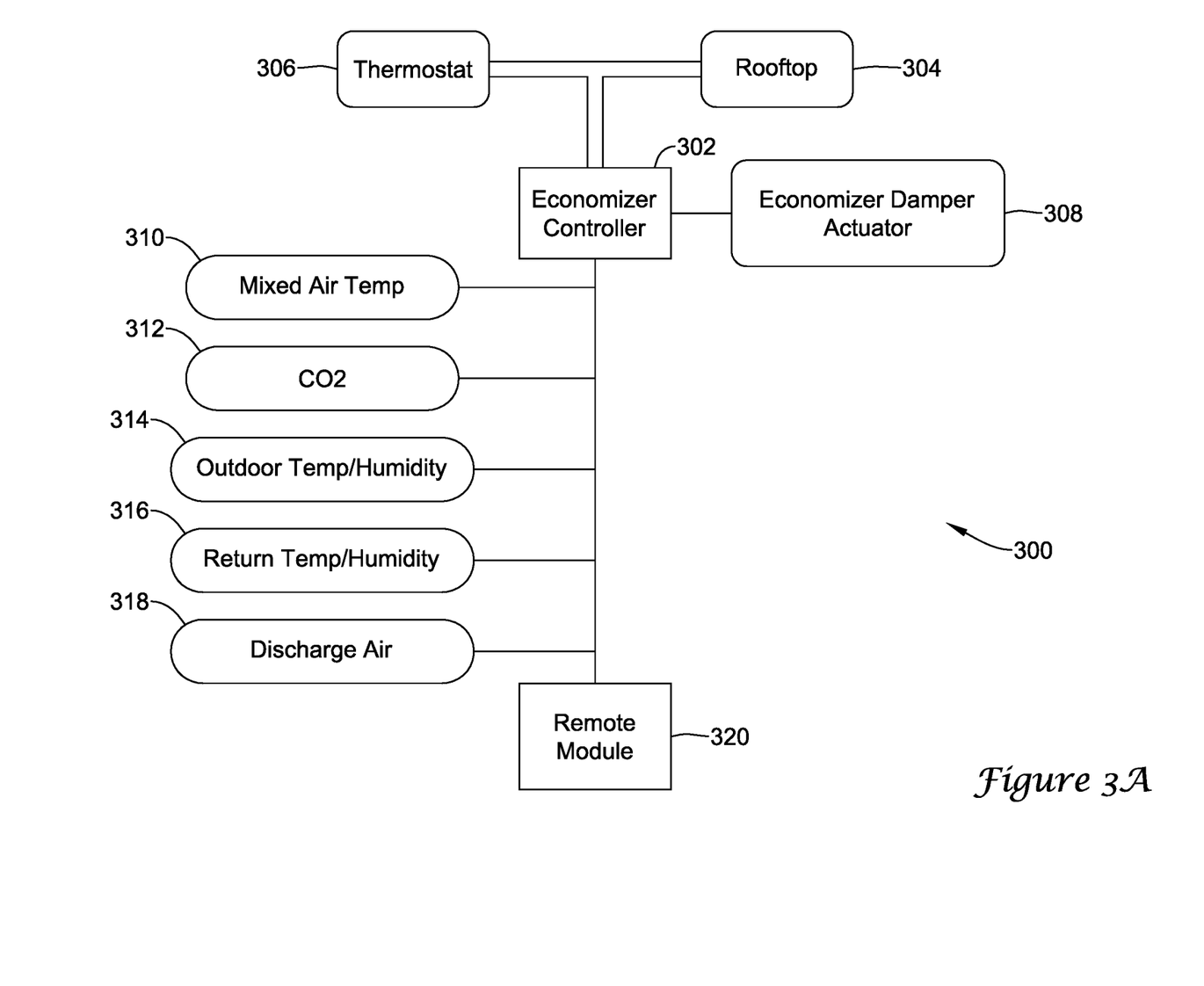
FIGS. 3A and 3B are block diagrams of an illustrative HVAC system utilizing DCV and/or economizing control.
Figure 3B:
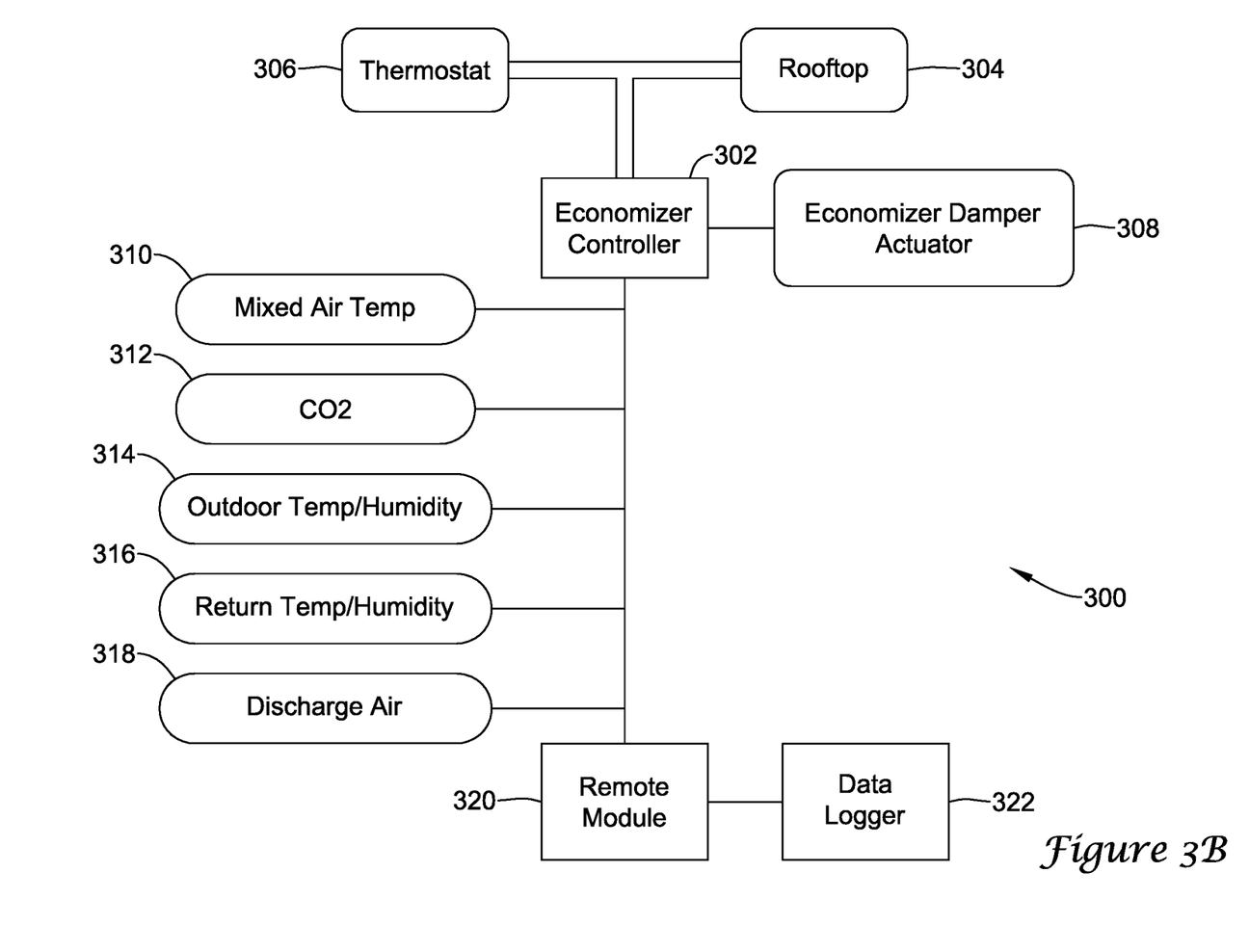

FIGS. 3A and 3B are block diagrams 300 illustrating how an illustrative DCV and/or economizer controller 302 may interact with the various components of the HVAC system 102. This is, however, just one example. In the example shown, a programmable controller, such as a thermostat 306, may be provided to control the HVAC unit(s) 106. The thermostat 306 may be in communication with the HVAC unit(s) 106, which in some instances may be rooftop unit(s) 304, however it is contemplated the HVAC unit(s) 106 may be located within the building or at some other location. The thermostat 306 may be configured to be programmable such that the building may be heated and/or cooled according to a desired set point schedule. In some instances, the thermostat 306 may communicate with the rooftop (or other) unit(s) 304 to turn the unit(s) 304 on and off as needed to satisfy a temperature set point inside the building. In some embodiments, the thermostat 306 may be hardwired to the rooftop (or other) unit(s) 304 while in other embodiments, the thermostat 306 may be in wireless communication with the rooftop unit(s) 304.

The thermostat 306 may be part of or in communication with a DCV and/or economizer controller 302. As discussed above, DCV and/or economizer controller 302 may be programmed to control ventilation to the building 104. For example, in addition to operating the HVAC unit(s) to provide a desired temperature, the HVAC system 102 may also be configured to bring a certain amount of fresh ventilation into a building as set out in, for example, building codes. When DCV and/or Economizer controller 302 is so provided, DCV and/or Economizer controller 302 may communicate with damper actuator 308 to selectively open and close dampers based on the amount of ventilation needed. In one example, DCV and/or Economizer controller 302 may receive a signal from a $CO_2$ sensor 312. When the amount of $CO_2$ in the building reaches a threshold level, the DCV and/or Economizer controller 302 may relay a signal to the damper actuator 308 to open a damper (for example, damper 122 in FIG. 1) to provide more fresh air to the building. Likewise, when the amount of $CO_2$ in the building falls below a threshold level, the DCV and/or economizer controller 302 may relay a signal to the damper actuator 308 to close or partially close a damper (for example, damper 122 in FIG. 1) to minimize the amount of conditioned air that is lost to atmosphere. In some instances, the damper actuator 308 may include a direct coupled actuator (DCA) such that the controller 302 may communicate digitally with the actuator 308. DCV and/or economizer controller 302 may also receive signals from other sensors such mixed air temperature 310, outdoor air temperature and/or humidity 314, return air temperature and/or humidity 316 sensors, and discharge air temperature 318. These parameters may be used to determine, for example, whether or not the DCV and/or Economizer controller 302 will draw in outside air in amounts greater than those needed to meet Demand Control Ventilation requirements.

In some instances, the DCV and/or Economizer controller 302 may be in communication with a remote monitoring device 320, or may be incorporated into the remote monitoring device 320, but this is not required or even desired in all embodiments. As discussed herein, the remote monitoring device 320 can be any one of a smart phone, tablet computer, personal computer, lap top computer, or dedicated device. In one illustrative example, remote monitoring device 318 may display operational parameters which may allow the user to monitor the HVAC system 102 remotely. For example, the remote monitoring device 320 may indicate that status of an HVAC unit (e.g. on/off), if free cooling (economizer mode) is available, DCV status (e.g. on/off), temperature/humidity readings from the various sensors, $CO_2$ levels (parts per million, ppm), fan speed (e.g. low/high), building occupancy, etc. The remote monitoring device 320 may be further configured to allow a user to input various parameters such as $CO_2$ threshold setpoints, temperature setpoints, percent of ventilation at high/low fan speeds, minimum and maximum calibration ventilation flow rates at one or more calibration damper positions—sometimes at various fan speeds, etc., to be provided to the DCV and/or economizer controller 302. The remote monitoring device 318 may be further configured to provide a user with system alerts and/or system faults. For example, the remote monitoring device may be able to alert the user to a malfunction within the rooftop unit 304 that the user may otherwise be unaware of. In another example, the remote monitoring device 320 may alert the user to a damper fault indicative of an improperly functioning damper. This may allow a user to maintain a DCV system/economizer 130 more effectively. The remote monitoring device 320 may be configured to provide an alert such as, but not limited to, an audible alarm, an indicator light, and/or display and/or send a message when a fault has been detected. The remote monitoring device 320 may be in communication with the controller 302 via a wired, wireless or any other suitable communication interface, as desired. It is contemplated that in some instances the DCV and/or economizer controller 302 may be capable of displaying operational parameters, receiving user inputs, and/or providing alerts.

As illustrated in FIG. 3B, in some instances, the remote monitoring device 320 may be in communication with a system level controller or server 322 or other data logging system. Such a data logging system may allow a user to monitor the trends of the system 102, which might help a user more effectively program and/or operate the HVAC system 102. For example, the user may be able to retrieve historical system data such as when the system 102 was able to function in economize and/or demand control modes. This may help the user and/or the controller 302 to better predict necessary system maintenance and/or when calibration of the system might be warranted. In another example, the server 322 may store a fault log including a list of damper faults, when each damper fault occurred (e.g. time stamp), and, in some cases, a type or description of each detected damper fault. This may aid a user in identifying a need for maintenance of a faulty damper such that the damper may be serviced and/or replaced.

Referring to FIGS. 1-3B, processor 220 of control module 212 may be configured to determine if a damper (e.g. dampers 120, 122, and/or 124) is functioning properly, and if not, detect a damper fault. A damper fault may occur when a damper is not in an expected position (e.g. open or closed) under certain conditions and/or when a damper does not respond or is slow to respond to a control signal for moving the damper between a first position and a second position. While the damper positions discussed herein are generally described as being either open or closed, it should be understood that the damper may be actuated by an actuator such that it can be at any position between fully open or fully closed.

Moving the damper between a first position and a second position may cause a change in the temperature of the mixed air 132 (indoor air and outdoor air), and may also cause the temperature of the discharge air 116 to change. Thus, when there is a difference in temperature between the outside air 123 and the return air 112, and when the damper is actuated from a fully closed position to a fully open position, a change in discharge air temperature is expected. A similar and opposite change in discharge air temperature is expected when the damper is actuated from a fully open position to a fully closed position. Thus, a determination as to whether the damper is functioning properly can be made based, at least in part, on the sensed discharge air temperature 116. The sensed discharge air temperature 116 may also be indicative of a damper position.

The discharge air temperature may be sensed using a discharge air temperature sensor 117 after the dampers 120/122/124 have been moved from a first position to a second position. The discharge air temperature 116 may then be compared to a discharge air temperature threshold stored in the controller memory 222. Depending on the expected state of the damper (e.g. open or closed), the controller 220 may determine a damper fault if the sensed discharge air temperature is greater than or less than the predetermined discharge air temperature threshold stored in the memory 222. The discharge air temperature threshold may be generated during calibration of the damper. A different discharge air temperature threshold may be generated for each of a range of different damper positions, from fully open to fully closed, and stored in the memory 222. Thus, it may also be possible to determine an approximate damper position from the sensed discharge air temperature when compared to the various different discharge air temperature thresholds.

In some cases, the controller 220 may also receive an indication of a damper position from a damper position sensor. Exemplary damper positions sensors 126 may include optical, magnetic, mechanical, ultrasonic or other sensors that may be configured to determine a damper position. When so provided, the sensed damper position may be compared to an expected damper position, such as the damper positioned commanded by the controller 220. The controller 220 may register a damper fault if the sensed damper position is not at the expected damper position or within a predetermined range of the expected damper position. Additionally, or alternatively, the controller 220 may be programmed to register a damper fault if the sensed damper position has not reached the expected damper position in a predetermined amount of time. In some instances, a damper position sensor 126 may be used to confirm a damper position determined using the outdoor air and discharge and/or mixed air temperature as further described herein.

In some cases, the controller 220 may be configured to provide an alert only after a predetermined number of damper faults have been detected. In some cases, the controller 220 may display an alert on a display of a local or remote user interface (e.g. user interface of remote monitoring device 146 or 320). The alert may be an audible or visual alert, and in some cases, may combine both an audible and visual alert. In some cases, the alert may be an alarm and may have different alarm stages.

In some cases, the controller 220 may be configured to record the damper fault in a fault log stored in the memory 222. The controller 220 may record information about the damper faults such as which damper faulted, how many damper faults are associated with a particular damper, a timestamp of each damper fault, if each damper fault was resolved, the duration of each of the damper faults, and/or any other suitable information. A user may access the information stored in the damper fault log through a local user interface or via the remote monitoring device 146 or 320. In some cases, the data stored in the damper fault log may be uploaded to a computer or server connected to the HVAC system and/or DCV/Economizer such that it may be analyzed and/or viewed remotely. These are just some examples.

In some embodiments, the controller 220 may initiate a damper fault test to confirm damper functionality and/or to determine if a damper fault is present. In some implementations, a damper fault may be determined based, at least in part, on an outdoor air temperature, a damper position, a discharge air temperature and a temperature threshold. If the controller 220 is configured to provide an alert only after a predetermined number of damper faults are detected, the controller may maintain a damper alert count using a counter. In some cases, the counter may be incremented by a single increment when a damper fault test is run and a damper fault is detected. To help reduce false positives, the controller 220 may decrease the counter by at least two increments (e.g. three increments) each time a damper fault test is run and no damper fault is detected. In this case, the damper alert counter may be incremented by the number of damper fault tests that detected a fault weighted by a first weight (e.g. one), and may be decremented by the number of damper fault tests that do not detect a fault weighted by a second weight (e.g. three). A damper alert may be generated if/when the damper alert count reaches or exceeds a damper alert count threshold. This is just one example.

Figure 4:
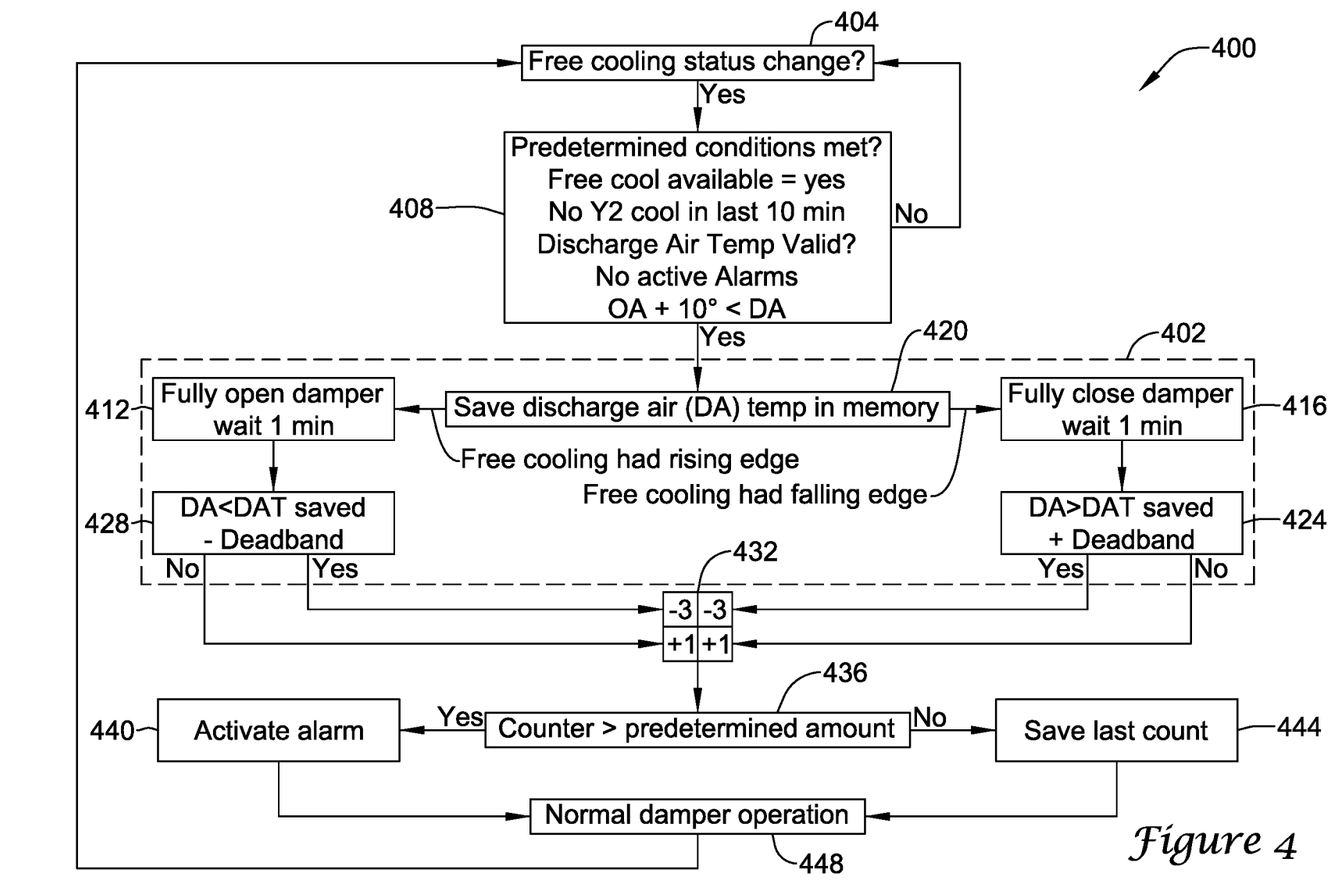
FIG. 4 is a flow chart of an illustrative method of determining a damper fault in a economizer/demand control ventilation (DCV) system.

FIG. 4 shows an illustrative method 400 of determining a damper fault using a damper fault test 402. The damper fault test 402 may be initiated by the controller 220 when certain conditions (Blocks 404 and 408) are present in the system. Pre-conditions for initiating a damper fault test 402 may include, but are not limited to, the availability of free cooling, whether there is a sufficient difference in temperature between the outside air 123 and the return air 112, whether or not cooling has recently been provided by the HVAC system in order to meet a temperature set point, whether or not there are any active alarms, and/or any other suitable condition.

In some cases, and referring specifically to FIG. 4, the controller 220 may determine that a free cooling status of the HVAC system has changed (Block 404). That is, whether free cooling has just been initiated or free cooling has just been terminated. If so, the controller 220 may determine if one or more predetermined conditions are met (Block 408). For example, at block 408, controller 220 may determine if free cooling is available (e.g. the outdoor air temperature and/or humidity is sufficiently less than the indoor air temperature/humidity), if there has been no call for second stage cooling (Y2) in the last ten (10) minutes, if there is no active alarms, if the discharge air temperature is within a valid or expected range, if the outdoor air temperature is less than the discharge air temperature by at least ten (10) degrees Fahrenheit (5.56 degrees Celsius), and/or any other suitable predetermined condition as desired.

If controller 220 determines that one or more of the predetermined conditions are met, and/or a predetermined set of predetermined conditions are met, the controller 220 may initiate a damper fault test, as shown at Block 402. In one example, the controller 220 may only initiate the damper fault test 402 when the outside air (OA) temperature differs from the discharge air (DA) temperature by at least ten (10) degrees Fahrenheit (5.56 degrees Celsius).

In some cases, the controller 220 may initiate the damper fault test 402 before opening the damper to provide free cooling to satisfy a temperature set point (Block 412). In some cases, the controller 220 may initiate the damper fault test 402 after a temperature set point has been reached using free cooling, but before closing the damper to terminate free cooling (Block 416). The opening and closing of the damper to control free cooling may be a result of a control algorithm executed by the controller 220 to control the temperature, ventilation and/or other environmental parameter within the building. That is, in some cases, the damper fault test 402 may not separately initiate the opening or closing of the damper, but rather may be performed in response to damper positional changes commanded by a control algorithm that is used to control the temperature, ventilation and/or other environmental parameter within the building.

Before making a damper position change, the damper fault test 402 may store a sensed discharge air temperature in the memory 222 of the controller 220 (Block 420). The controller 220 may use the sensed discharge air temperature stored in the memory to determine whether or not a damper fault is present. For example, upon executing the damper fault test 402, the controller 220 may determine that a damper fault is present if: the damper has moved to the closed position at least a minute ago; and the stored discharge air temperature plus a predetermined deadband is not less than the discharge air temperature sensed after the damper is closed (Block 424). This, of course, assumes that the outdoor air temperature is less than the discharge air temperature (or mixed air temperature or return air temperature) by at least a predetermined amount (e.g. ten degrees F.), as determined in Block 408. In another example, upon executing the damper fault test 402, the controller 220 may determine that a damper fault is present if: the damper has moved to the open position at least a minute ago; and the stored discharge air temperature minus a predetermined deadband is not greater than the discharge air temperature sensed after the damper is opened (Block 428). Again, this assumes that the outdoor air temperature is less than the discharge air temperature (or mixed air temperature or return air temperature) by at least a predetermined amount (e.g. ten degrees F.), as determined in Block 408.

If the controller 220 detects a damper fault, the controller 220 may in some cases increase a damper alert counter by a single increment (Block 432). If no fault is detected, the controller 220 may decrease the damper alert counter by a predetermined number of increments. In some cases, the damper alert counter may be decreased by a greater number of increments (e.g. three) to help reduce the possible impact of false positive damper fault tests. In some cases, the controller 220 may issue an alert if the value of the damper alert counter reaches or exceeds a damper alert count threshold (Blocks 436 and 440). The damper alert count threshold may be set at the factory and/or may be adjusted by a user/contractor to increase or decrease the fault sensitivity. If the damper alert counter has not exceeded the damper alert count threshold, the last damper alert counter value is stored in the memory (Block 444). Control may then be passed back to Block 448. The process may be repeated in response to changes in the position of the damper.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method for controlling a Demand Control Ventilation and/or Economizer system having a return air inlet, an outdoor air inlet and a discharge air outlet, the method comprising:
   opening and closing an outdoor air damper of the Demand Control Ventilation and/or Economizer system to provide free cooling as necessary to a building;
   when the outdoor air damper is to be opened to provide free cooling, performing a damper open fault test that comprises:
      before opening the outdoor air damper, saving a discharge air temperature of the discharge air passing through the discharge air outlet;
      opening the outdoor air damper;
      after opening the outdoor air damper, sensing the discharge air temperature and determining if the sensed discharge air temperature has fallen relative to the stored discharge air temperature by at least a predetermined amount, and if not, indicating a damper open fault;
   when the outdoor air damper is to be closed after providing free cooling, performing a damper close fault test that comprises:
      before closing the outdoor air damper to a closed position, saving the discharge air temperature of the discharge air passing through the discharge air outlet;
      closing the outdoor air damper; and
      after closing the outdoor air damper, sensing the discharge air temperature, and determining if the sensed discharge air temperature has risen relative to the stored discharge air temperature by at least a predetermined amount, and if not, indicating a damper close fault.

2. The method of claim 1, further comprising determining a damper open alarm condition based at least in part on the number of times the damper open fault test indicates a damper open fault and the number of times the damper open fault test does not indicate a damper open fault.

3. The method of claim 2, further comprising determining a damper close alarm condition based at least in part on the number of times the damper close fault test indicates a damper close fault and the number of times the damper close fault test does not indicate a damper close fault.

4. The method of claim 3, further comprising maintaining a damper open counter, wherein the damper open counter is incremented by a first amount each time the damper open fault test indicates a damper open fault, and is decremented by a second amount each time the damper open fault test does not indicates a damper open fault, wherein the first amount is different from the second amount.

5. The method of claim 4, wherein the damper open alarm condition is set when the damper open counter exceeds a threshold.

6. The method of claim 1, further comprising determining a damper close alarm condition based at least in part on the number of times the damper close fault test indicates a damper close fault and the number of times the damper close fault test does not indicate a damper close fault.

7. The method of claim 6, wherein each of the number of times the damper close fault test indicates a damper close fault is weighted by a first weight, and each of the number of times the damper close fault test does not indicate a damper close fault is weighted by a second weight, wherein the first weight is different from the second weight.

8. The method of claim 7, further comprising maintaining a damper close counter, wherein the damper close counter is incremented by the first weight each time the damper close fault test indicates a damper close fault, and is decremented by the second weight each time the damper close fault test does not indicates a damper close fault.

9. The method of claim 8, wherein the damper close alarm condition is set when the damper close counter exceeds a threshold.

10. The method of claim 1, further comprising:
    determining when the discharge air temperature does not exceed the temperature of outdoor air in the outdoor air inlet by at least a predetermined amount; and
    not performing the damper open fault test when the outdoor air damper is to be opened to provide free cooling when the discharge air temperature does not exceed the temperature of the outdoor air in the outdoor air inlet by at least the predetermined amount.

11. The method of claim 1, further comprising displaying a damper fault indicator on a display.

12. The method of claim 11, wherein the damper fault indicator is based, at least in part, on the number of damper open fault tests that resulted in an indication of a damper open fault.

13. The method of claim 12, wherein the damper fault indicator is further based on the number of damper open fault tests that did not result in an indication of a damper open fault.

14. The method of claim 11, wherein the damper fault indicator is based, at least in part, on a number of damper close fault tests that resulted in an indication of a damper close fault.

15. The method of claim 14, wherein the damper fault indicator is further based on the number of damper close fault tests that did not result in an indication of a damper close fault.

16. A method for controlling a Demand Control Ventilation and/or Economizer system having a return air inlet, an outdoor air inlet and a discharge air outlet, the method comprising:
    opening and closing an outdoor air damper of the Demand Control Ventilation and/or Economizer system to provide free cooling as necessary to a building;
    when the outdoor air damper is to be opened to provide free cooling, performing a damper open fault test that comprises:
        before opening the outdoor air damper, saving a discharge air temperature of the discharge air passing through the discharge air outlet;
        opening the outdoor air damper; and
        after opening the outdoor air damper, sensing the discharge air temperature and determining if the sensed discharge air temperature has fallen relative to the stored discharge air temperature by at least a predetermined amount, and if not, indicating a damper open fault.

17. The method of claim 16, further comprising determining a damper open alarm condition based at least in part on the number of times the damper open fault test indicates a damper open fault and the number of times the damper open fault test does not indicate a damper open fault.

18. The method of claim 17, further comprising maintaining a damper open counter, wherein the damper open counter is incremented by a first amount each time the damper open fault test indicates a damper open fault, and is decremented by a second amount each time the damper open fault test does not indicates a damper open fault, wherein the first amount and the second amount are different.

19. A method for controlling a Demand Control Ventilation and/or Economizer system having a return air inlet, an outdoor air inlet and a discharge air outlet, the method comprising:
    opening and closing an outdoor air damper of the Demand Control Ventilation and/or Economizer system to provide free cooling as necessary to a building;
    when the outdoor air damper is to be closed after providing free cooling, performing a damper close fault test that comprises:
        before closing the outdoor air damper to a closed position, saving the discharge air temperature of the discharge air passing through the discharge air outlet;
        closing the outdoor air damper; and
        after closing the outdoor air damper, sensing the discharge air temperature, and determining if the sensed discharge air temperature has risen relative to the stored discharge air temperature by at least a predetermined amount, and if not, indicating a damper close fault.

20. The method of claim 19, further comprising determining a damper close alarm condition based at least in part on the number of times the damper close fault test indicates a damper close fault and the number of times the damper close fault test does not indicate a damper close fault.

* * * * *